Patented Feb. 11, 1947

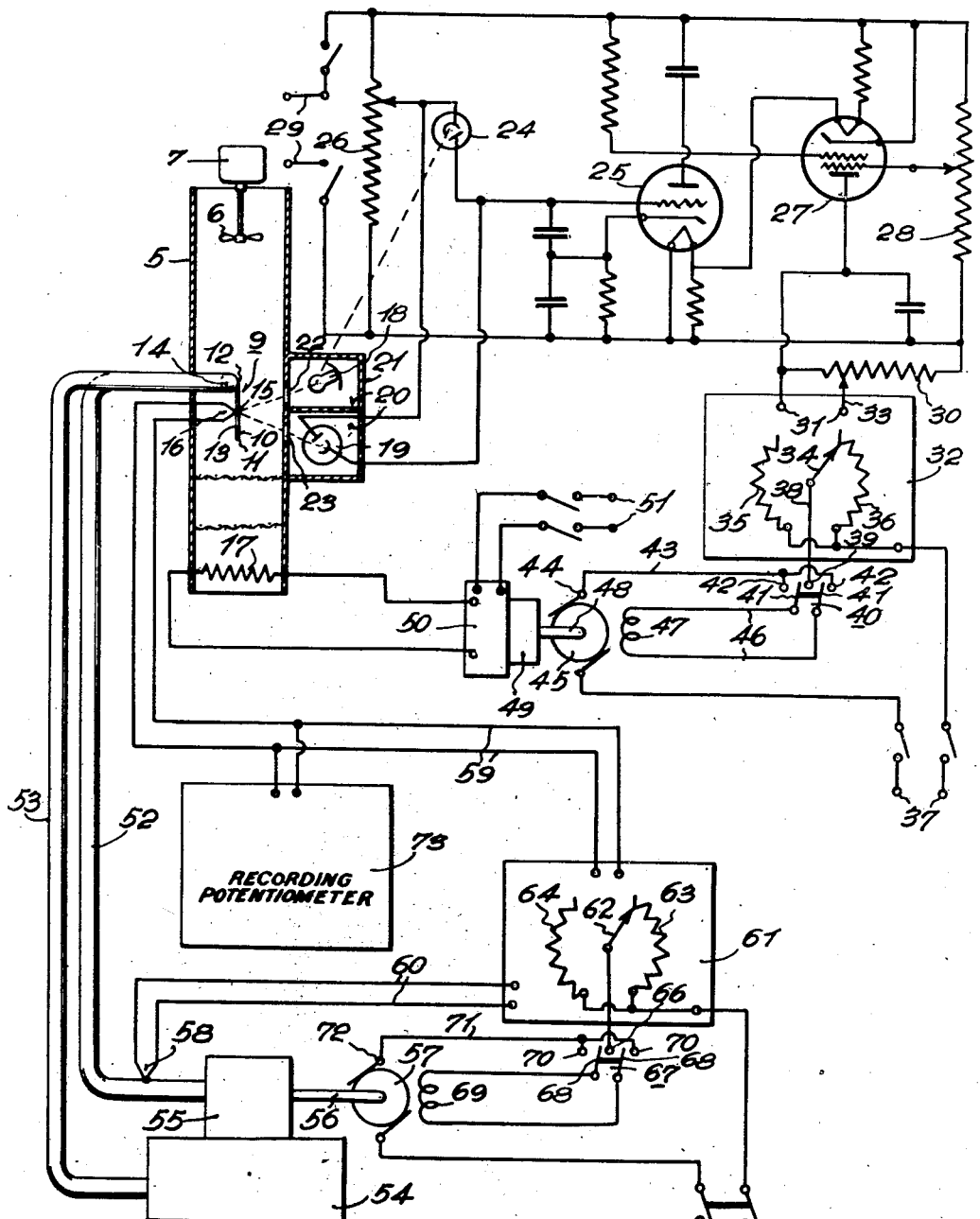

2,415,776

UNITED STATES PATENT OFFICE 2,415,776

DEW POINT RECORDING APPARATUS

Sylvan Brooks Walton, Lexington, Ky.

Application May 5, 1945, Serial No. 592,243

6 Claims. (Cl. 73—17)

This invention relates to determination of dew point temperatures of gases, and is specifically directed to apparatus for accurate determination of the temperature at which a gas, or vapor content of a gas, condenses, or the temperature at which equilibrium occurs between a gaseous phase and liquid or solid phase.

Prior devices intended for the same purpose have endeavored to accomplish the desired determination by means of a body maintained at a controllable temperature by a heat-exchange device for bringing the temperature of a surface exposed to the gas to the dew point temperature of the gas, as indicated by the appearance of condensate on the surface, and a temperature-measuring instrument for measuring the temperature at which condensate appears, the method comprising varying the temperature of the surface, and consequently the temperature of the gas in contact with it, until the appearance of condensate upon the surface indicated the arrival of the gas at the dew point temperature. Such devices have not been completely satisfactory, due to the fact that the indication relied upon has been the appearance or disappearance of condensate on the variable temperature surface, and, since there can be no indication of a condition of equilibrium between the gaseous and other phases, presence of condensate can indicate only that the gas is at or below its dew point temperature, while absence of condensation indicates only that the gas is at or above its dew point temperature. The present invention overcomes this serious defect of prior devices by providing a positive, accurate and continuous indication of the temperature at which equilibrium between the gaseous phase and the liquid or solid phase of the gas occurs.

One object of the present invention is the provision of a novel arrangement for determining the dewpoint temperature of a gas.

Another object is the provision of a novel instrument for making such determination, which instrument will present a continuous and accurate indication of the temperature at which condensation from a gas occurs.

Still another object is the provision of apparatus that presents an accurate indication of the temperature at which equilibrium occurs between a gaseous phase and a liquid or solid phase.

Still another object is the provision of such an instrument that will be automatic in its operation, and which will give accurate indications without requiring adjustment other than a preliminary fixation of a temperature range that embraces the dew point temperature of the particular gas to be tested.

The accompanying drawing is a schematic showing of the measuring instrument in cross section, wiring diagrams of control, and recording and indicating circuits that may be used in operating the instrument.

Describing the drawing in detail, the instrument that serves to indicate the temperature at which dew point of a test gas occurs is enclosed by a tube, designated 5, within which are arranged the elements by means of which a gas flowing through the tube is brought to its dew point temperature, as well as measuring devices that indicate that temperature. At one end of the tube, shown as being the exhaust end, is a device for moving a stream of the gas to be tested through the tube, as a fan 6 driven by a motor 7. Gas is drawn into the intake end of the tube from a suitable source of supply, not shown in the drawing.

The operating parts of the instrument within the tube 5, by means of which a temperature gradient is established in the gas stream and extending in the direction of flow of the stream, comprise a heat-conductive body which may take the form of a plate 9, having a flat surface 10 that is disposed parallel to the axis of the tube 5 and therefore parallel also to the direction of flow of the gas stream that passes through the tube, and the surface 10 is exposed to the flowing gas so that the latter flows across and in contact with it. At a point spaced away from the leading edge 11 of the surface 10, and preferably closely adjacent its trailing edge 12, and on the surface 13 of the plate that is opposite the surface 10, is mounted a heat-exchange device in the form of a tube 14, disposed transversely to the direction of flow of the gas stream.

Assuming that a gas stream flowing through the tube 5 is, in the region of its first contact with the surface 10, at or near the leading edge 11, at a temperature different from that of the plate 9 in the region adjacent its trailing edge 12 and imposed by the tubular heat-exchange device 14, it will be evident that a temperature gradient will be established along the surface 10 of the plate, with one extreme located at or near the leading edge 11 and being a temperature imposed on the plate by heat-exchange with the gas flowing in contact with such region, and the other extreme located in the region of the trailing edge 12 and being at a temperature imposed upon such region by the tube 14. By heat transfer between the surface 10 and the immediately adjacent portion of the gas stream that flows across and in contact with such surface, a corresponding gradient is established in such contacting portion of the gas stream. It will also be evident that if one extremity of this temperature gradient is maintained at a temperature above the dew point temperature of the gas, and the other extreme at a temperature below such dew point temperature, the dew point temperature will be located at some definite point on the surface 10, between the leading and trailing edges 11 and 12, and in the path of the gas stream; and that measurement of the temperature of the surface 10 at the location of such point will give an accurate indication of the dew point temperature of the gas. The following described arrangements provide means for accomplishing such measurement.

A predetermined point 15 on the surface 10, spaced from and lying between the leading and trailing edges 11 and 12 and in the path of the gas across the surface 10, is used as the point at which the temperature of the gas is determined. The temperature of the gas may be measured by an instrument having its temperature responsive element fixed to the rear surface 13 opposite the point 15, and in the illustrated arrangement comprises a thermocouple 16, which by means of a suitable circuit gives an indication of the temperature of the point 15. The physical location of the point at which the gas is at its dew point temperature may be adjusted along the surface 10, in either direction parallel to the direction of stream flow, by varying one or the other of the extremes of the temperature gradient, that is to say, by changing the relative temperatures of the extremes of the gradient. This adjustment is carried out in a way that brings the physical location of the dew point temperature to the predetermined point 15, the temperature of which is measured with the aid of thermocouple 16, so that the latter, being responsive to the temperature of the surface at that point, will give an accurate response of the dew point temperature of the gas.

To accomplish such an adjustment, and to give to the apparatus a variable range so that it may be used for testing different gases having widely different dew point temperatures, means may be provided for controlled application of heat to the region of one of the temperature gradient extremes, and for extraction of heat from the region of the other extreme. In the system illustrated, the tube 14 is used to cool the region of the plate, and the surface 10 thereof, adjacent the trailing edge 12, while an electric heating element 17 is disposed in the path of the gas stream in a position to heat the stream prior to its contact with the plate 9, the heating element being preferably mounted as shown, extending across the tube 5 adjacent the intake end of the latter. In order to indicate the physical location of the dew point temperature along the surface 10 of the plate, that surface is formed as a highly polished, light-reflecting surface, so that condensation will take place throughout so much of the surface as may be at temperatures below the dew point temperature of a gas flowing along it, and there will be a readily ascertainable demarcation between the area below the critical temperature, which will be covered by the condensate, and the area that is above such temperature and which will be free of condensate. The line of demarcation between these two visibly distinguishable areas will be located at the precise point at which the surface 10 and the contacting gas are at the dew point temperature of the gas. Adjustment of the location of the line of demarcation between the two areas, and therefore of the physical location of the dew point temperature, is accomplished by varying the temperature of the heater, or that of the tube 14, such adjustment being effected to bring the line of demarcation to the point 15 of temperature measurement.

To render the instrument automatic, and continuous in operation, the following-described electrical controlling circuits may be employed.

A light source 18, and a photosensitive tube 19, are so arranged relative to the reflecting surface 10 that the former directs a beam of light upon the surface at the point 15, at such an angle as to be received after reflection by the light sensitive tube. The source and tube may be mounted on the outside of the tube 5 in pockets 20 of a light-excluding housing 21, small apertures 22 and 23 being provided in the wall of the tube for passage of the light beam from the source to the point 15 and from the latter to the tube 19. The photosensitive tube 19 is connected in a controlling circuit, which may be of the type illustrated, being connected in parallel with a second light sensitive tube 24, in the grid circuit of an amplifying tube 25, and potential being applied to the said parallel circuit by means of a rheostat 26. The output of the amplifying tube 25 is applied to the control grid of a tetrode 27 the screen grid voltage of which is controlled by a rheostat, which together with the rheostat 26 is connected across a power supply 29. This complete circuit is a standard phototube circuit used to amplify the potential created by the light sensitive tubes 19 and 24, a detailed description of the circuit being contained in Bulletin No. PT-2OR-1, copyrighted 1940 by R. C. A. Manufacturing Co. Use of the circuit in the present arrangement is advantageous for a number of reasons, the chief one being that, when the photosensitive tube 24 is actuated by the same light source 18 as is the photosenitive tube 19, as shown, operation of the controlling circuit is not affected by fluctuations in light input due to small variations in line voltage of the power supply. Another advantage of the circuit is that it can be operated directly with 117 volts alternating current. Other types of photosensitive tube-controlled circuits may be substituted.

The resistor 30 of a rheostat is connected in the plate circuit of the tube 27, while the operating circuit leads 31 of a potentiometer 32 are connected across a variable portion of such resistor, being connected respectively to the plate of the tube 27 and the movable arm 33 of the rheostat. The contact arm 34 of the potentiometer movably contacts one or the other of two resistances 35 and 36, according to the direction in which the arm 34 is rotated in response to the amplitude of the current flowing through the circuit leads 31. The resistances 35 and 36 respectively are connected at their corresponding ends to one lead of a power supply 37, and the contact arm 34 is connected by a lead 38 to the common terminal 39 of a double throw dipole switch 40, the movable contacts 41 of which are arranged to be thrown in one or the other direction according to the positioning of the contact arm 34 of potentiometer 32 on resistances 35 or 36. The fixed contacts 42 are connected by a common lead 43 to the commutator circuit 44 of a series-connected motor 45, and through such circuit to the second lead of the power supply 37, and the movable contacts 41 are connected by leads 46 to the field winding 47 of the motor. Consequently the speed and direction of the motor 45 will depend upon the direction and degree of rotation of the potentiometer contact arm 34.

The motor 45, by means of a drive shaft 48 and reduction gearing, indicated as enclosed in a casing 49, operates a current-controlling device 50 which may be a rheostat or variable voltage transformer, and which is included in a supply circuit 51 that supplies the electric heater 17 by means of which the gas stream is heated in the tube 5.

The potentiometer 32, switch 40, variable speed and reversible motor 45, all are well known electrical devices, and when combined together with a photo-sensitive tube-actuated controlling circuit, comprise an efficient and accurate means for varying the heat supplied by the element 17 to the gas stream for bringing the location of the dew point temperature of the gas to the point 15 at which the temperature is constantly being measured by the thermocouple 16. To accomplish this result, the circuit arrangement is such that when the light beam reflected from the point 15 is diffused by condensate on the surface at the point 15, the circuit operates to increase the voltage applied across the heating element 17, resulting in an increase in the heat delivered to the gas stream, with a consequent increase in the upper temperature extreme of the temperature gradient, and a movement of the location of the dew point temperature toward the lower temperature extreme, and consequently toward the point 15. An opposite effect is produced by impingement of an undiffused beam upon the light-sensitive tube, resulting in reduction of the heat applied to the gas stream, and movement of the location of the dew point temperature toward the heater. Thus the tendency of the entire organization is always to move the location of the dew point temperature toward the point 15, so that the thermocouple 16 will be energized by a temperature that accurately represents the dew point temperature of the gas.

Control of the cooling effect of the tube 14 may be by any suitable refrigeration system capable of maintaining a constant temperature at the portion of the plate adjacent its trailing edge 12, and preferably being adjustable so that the temperature so maintained may be selected in accordance with the gas to be tested. The illustrated system exemplifies a suitable cooling system for this purpose. In the illustrated system the tube 14 is connected between tubular supply and return lines 52, 53 that conduct a cooling fluid between a refrigeration unit 54 and the tube. Operation of the unit 54 is regulated by a suitable control 55 that is actuated by a rotatable shaft 56 driven by a reversible and variable speed motor 57. The unit 54, control 55 and motor 57 are all of standard, commercial design.

In the supply line 52, adjacent the output of the unit 54, is a thermocouple 58, which acts as the cold junction for the thermocouple 16 in a temperature-regulating circuit of known type. The thermocouples 16 and 58 are connected respectively, by leads 59 and 60, to a potentiometer 61, also of well known type, being of such construction and arrangement that the direction and degree of rotation of a contact arm 62 is determined by relative amplitude of currents delivered to the instrument by the respective thermocouples. The arm 62 contacts one or the other of two rheostat resistors 63 and 64, thereby determining the amplitude of current that passes through the arm 62 from one lead of a power supply 65 and to the common, fixed terminal 66 of a double throw dipole switch 67. The movable contacts 68 of the switch are connected to the field winding 69 of the motor 57, and alternately contact the fixed, common terminal 66 and one of a pair of fixed terminals 70 that are connected by a common lead 71 to the commutator circuit 72 of the motor 57, and through such circuit to the other lead of the power supply 65. The movable contacts 68 of the switch 67 are thrown to one position or the other according to the positioning of the contact arm 62 of the potentiometer to contact one or the other of the resistors 63 or 64, and by reversing the direction of current flow through the field winding of the motor controls the direction of the motor, and actuation of the refrigerator unit control 55. With the refrigerating unit set for maintaining the tube 14 at a suitable temperature, a balanced condition of the currents from the two thermocouples will maintain the contact arm 62 in a central position out of contact with the two resistors. Variation of the temperature of the tube, or of the fluid delivered from the unit 54, will unbalance the currents, moving the contact arm into contact with one or the other of the resistors and throwing the switch 67 in the direction that will cause rotation of the motor in the direction appropriate to actuate the control 55 to alter operation of the unit 54 to bring back the temperature to its correct setting.

In order to produce a continuous record of the dew point temperature of a continuing stream of gas through the tube 5, a recording potentiometer 73 is connected across the leads 59 of the thermocouple 16 that measures the temperature of the point 15. As in the case of the other electrical devices used in the controlling circuits, this instrument may be of any standard and well known type, and may include means for giving visual indication as well as recording the temperature of the gas at the point 15 at any given time.

In making a test with the instrument, gas is supplied to the intake end of the tube 5 and is drawn through the tube, passing across and in contact with the surface 10 of the plate. With the refrigerating unit 54 set to produce a suitable temperature of the surface 9 adjacent the trailing edge, the temperature of the gas stream is brought to a suitable point by adjusting any of the rheostat controls 26, 28 or 33, or by an adjustment of the intensity of the light source 18. A suitable method of adjustment comprises short circuiting the current of the supply circuit 51 around the control 50 and to the heating element 17, and thereafter adjusting one of the rheostats, or the light intensity, until the contact arm 34 of the potentiometer 32 has reached a predetermined position on that one of the resistors 35 or 36 which causes the motor 45 to rotate in the direction that reduces the current supplied to the heating element 17. After the arm 34 has reached the predetermined position, removal of the short circuit will initiate normal operation of the controlling circuits to precisely adjust the location of the dew point temperature to the point 15 so that such temperature may be measured by the thermocouple 16.

The above-described instrument, and the indicated method by means of which it operates, serve to provide accurate, continuous measurement, and recording, of the temperature at which condensation of a vapor, or vapor content of a gas, or the temperature at which a change occurs between gaseous and solid or liquid phases. The term "dew point temperature" is intended to include the temperature at which any such change occurs.

It will be appreciated that a large number of modifications of apparatus may be employed in the instrument for practicing the method, the basic concept of the method residing in establishment of a temperature gradient extending along a gas stream, and measurement of the temperature of the gas at the line of demarcation between regions of the stream that respectively are above and below the dew point temperature of the gas, which regions are indicated by the presence or absence of condensation. The specific arrangement herein disclosed is merely an exemplification of apparatus that may be employed to accomplish the desired measurement.

I claim:

1. An instrument for determining the dew point temperature of a gas comprising a heat-conductive body having a light-reflecting surface, means for directing a stream of the gas to be tested across the said surface, a temperature measuring device arranged to indicate the temperature of the gas at a predetermined point in the path of the gas across the said surface, heating and cooling devices spaced apart in the direction of stream flow and on opposite sides of the said predetermined point, said devices acting to establish between them a temperature gradient in the gas stream and body, at least one of the said devices being variable to move the location of the dew point temperature of the gas along the light-reflecting surface, a light source arranged to direct light upon the reflecting surface at the said predetermined point, and a photosensitive control arranged to receive light reflected from the said point and controlling the variable one of the said devices according to the presence or absence of vapor condensed on the reflecting surface at the predetermined point to move the location of the dew point temperature of the gas to the said predetermined point of temperature measurement.

2. In an instrument for determining the dew point temperature of a gas that includes a heat-conductive body having a light-reflecting surface, means for directing a stream of the gas to be tested across the said surface, and a light source arranged for directing light on a point of the reflecting surface; in combination, spaced heat-exchange devices arranged to establish between them a temperature gradient in the gas stream and body and embracing the dew point temperature of the gas, said devices being located on opposite sides of the point of the reflecting surface upon which the light source directs light, a temperature-measuring device for indicating the temperature of the gas at the said point, an electric circuit controlling the operation of one of the said heat-exchange devices, and a photosensitive control device for the said circuit arranged to detect the presence or absence of condensed vapor on the reflecting surface at the point of light reflection and to operate the circuit to move the location of the dew point temperature of the gas in one or the other direction according to the presence or absence of condensed vapor at the said point and thereby bring the location of the dewpoint temperature to the point of reflection and temperature measurement.

3. In an instrument for determining the dew point temperature of a gas that includes a heat-conductive body having a light-reflecting surface, means for directing a stream of the gas to be tested across the said surface, a light source arranged to direct light upon the said surface, and a photo-sensitive circuit-controlling device arranged to receive light reflected from a point on the said surface; in combination, a temperature-measuring device arranged to indicate the temperature of the gas at the point from which the photo-sensitive device receives light, a heater arranged in the path of the gas in advance of the said point, a device for cooling the heat-conductive body at a point spaced on the opposite side of the photo-sensitive device, and a circuit controlling the operation of the said heater and including the said photo-sensitive device, and operating to heat the gas more or less according to the presence or absence of condensed vapor at the point from which the photo-sensitive device receives light, to move the location of the dew point temperature of the gas in a direction to bring it to the said point.

4. In an instrument for determining the dew point temperature of a gas, a plate of heat-conductive material, means for directing a stream of the gas to be tested across a front surface thereof from a leading to a trailing edge, a tube secured to a rear surface of the plate and arranged to control the temperature of the front surface adjacent the trailing edge, a heating device arranged to control the temperature of the gas prior to its contact with the front surface at the leading edge, means for supplying a cooling fluid to the said tube, means for regulating the heater, and a temperature-measuring device arranged to indicate the temperature of a fixed point of the front surface in the path of the gas and spaced between the leading and trailing edges.

5. In an instrument for determining the dew point temperature of a gas and comprising a heat-conductive body having a light-reflective surface, means for directing a stream of the gas to be tested across the said surface, and heat-exchange devices arranged respectively to heat and cool the said surface in regions spaced apart in the direction of flow of the gas stream; in combination, a light source and a light-sensitive tube arranged respectively to direct upon and receive from a predetermined point on the reflective surface a beam of light, a control for the heating device actuated by the light-sensitive tube, means for maintaining the cooling device at a selected temperature below the dew point temperature of the gas, and a temperature-measuring device for indicating the temperature of the said surface at the said predetermined point.

6. The combination of claim 5, wherein the means for maintaining the cooling device at a selected temperature comprises a refrigerating unit and a control for the said unit actuated by the combined effects of the temperatures at the predetermined point of temperature measurement and at the cooling device.

SYLVAN BROOKS WALTON.

REFERENCES CITED

The following references are of record in the file of this patent:

UNITED STATES PATENTS

| Number | Name | Date |
|---|---|---|
| 2,316,624 | Romanelli | Apr. 13, 1943 |

FOREIGN PATENTS

| Number | Country | Date |
|---|---|---|
| 632,680 | German | July 11, 1936 |